United States Patent
Arenz et al.

(10) Patent No.: US 7,177,129 B2
(45) Date of Patent: Feb. 13, 2007

(54) CIRCUIT BREAKER HAVING A MICROPROCESSOR-CONTROLLED TRIPPING DEVICE AND A BYPASS CIRCUIT

(75) Inventors: Bernd Arenz, Bonn (DE); Wolfgang Schwarz, Cologne (DE)

(73) Assignee: Moeller GmbH, Bonn (DE)

( * ) Notice: Subject to any disclaimer, the term of this patent is extended or adjusted under 35 U.S.C. 154(b) by 50 days.

(21) Appl. No.: 10/507,283

(22) PCT Filed: Mar. 8, 2003

(86) PCT No.: PCT/EP03/02381

§ 371 (c)(1),
(2), (4) Date: Sep. 10, 2004

(87) PCT Pub. No.: WO03/077396

PCT Pub. Date: Sep. 18, 2003

(65) Prior Publication Data

US 2005/0162796 A1 Jul. 28, 2005

(30) Foreign Application Priority Data

Mar. 13, 2002 (DE) .................. 102 10 920

(51) Int. Cl.
*H02H 3/08* (2006.01)
*H02H 9/02* (2006.01)
*J02H 3/08* (2006.01)

(52) U.S. Cl. ..................... 361/93.1; 361/93.6
(58) Field of Classification Search ............. 361/93.1, 361/93.6

See application file for complete search history.

(56) References Cited

U.S. PATENT DOCUMENTS 5,214,560 A    5/1993   Jensen .................. 361/93

FOREIGN PATENT DOCUMENTS

| DE | 4445060 | 4/1996 |
| DE | 19927030 | 12/2000 |
| EP | 0440764 | 1/1995 |

*Primary Examiner*—Stephen W. Jackson
*Assistant Examiner*—Dharti H. Patel
(74) *Attorney, Agent, or Firm*—Darby & Darby

(57) ABSTRACT

A circuit breaker includes current detectors, a microprocessor-controlled tripping device, and a bypass circuit that interacts with a watchdog circuit that monitors the proper functioning of the microprocessor. A switchable reference voltage is made available to the bypass circuit as a function of the momentary supply voltage. During short circuits, the bypass circuit, immediately upon being switched on, responds to very high limit current values, whereas after the switch-on phase, it already responds at moderately high limit current values.

19 Claims, 2 Drawing Sheets

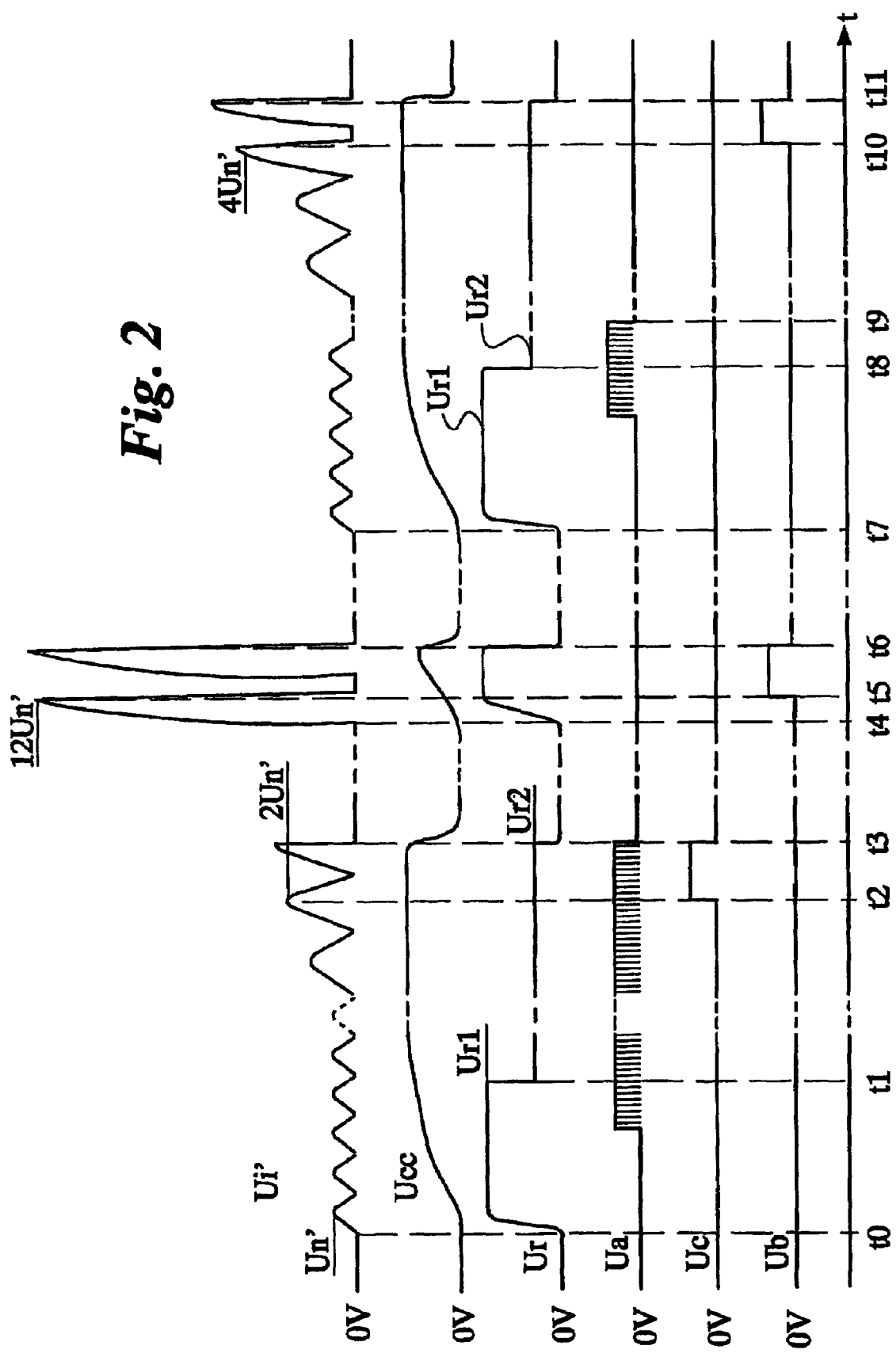

CIRCUIT BREAKER HAVING A MICROPROCESSOR-CONTROLLED TRIPPING DEVICE AND A BYPASS CIRCUIT

The invention relates to a circuit breaker, especially for low voltage, comprising an electronic, microprocessor-controlled tripping device and a bypass circuit.

BACKGROUND

German patent specification DE 44 45 060 C1 discloses a circuit breaker comprising a bypass circuit (not elaborated upon there), by means of which the circuit breaker is automatically tripped if—for any reason whatsoever—the electronic tripping device does not trip the circuit breaker in spite of the fact that settable parameters have been exceeded, especially the tripping current and the associated delay time.

German patent application DE 199 27 030 A1 discloses a circuit breaker comprising an electronic, microprocessor-controlled tripping device and a bypass circuit (not elaborated upon there) which serve to effectuate an automatic tripping of the circuit breaker when the preset tripping current has been exceeded without tripping, and also comprising a watchdog circuit to monitor the function of the microprocessor. The bypass circuit is connected to the watchdog circuit and it has switching means (not elaborated upon there) that serve to control the current-dependent and time-dependent response characteristic curve of the bypass circuit as a function of the failure of a functional area of the microprocessor indicated by the watchdog circuit.

U.S. Pat. No. 5,214,560 discloses a watchdog monitor that functions as a bypass circuit for the microprocessor of the electronic tripping device of a circuit breaker. The monitoring circuit is made up of discrete components and consists of the serial connection of a high pass filter, of a transistor switch, of a timing circuit with a charging capacitor and of a voltage comparator. The properly operating microprocessor continuously emits watchdog pulses via the high pass filter to the transistor switch, whose output pulses continuously discharge the timing circuit, so that voltage cannot build up in the timing circuit since this could cause the comparator to toggle. If, in contrast, the watchdog pulses are absent due to a failure, then the charging capacitor soon reaches a voltage level that causes the comparator to toggle and, via its output, in turn, a tripping coil becomes excited, as a result of which the circuit breaker opens. A transistor switch arranged at the input of the high pass filter allows the watchdog pulses to be short-circuited so that an error function of the microprocessor can be simulated in order to test the bypass circuit.

SUMMARY OF THE INVENTION

After such a circuit breaker has been switched on, the supply voltage(s) only build(s) up gradually, so that the microprocessor and the bypass circuit can only operate properly after a certain delay. This is particularly disadvantageous if the circuit breaker is switched on during an already existing short circuit, which could have dire consequences for the circuit breaker itself and/or for the systems that are supposed to be protected by the circuit breaker.

Therefore, it is an object of the present invention to provide the protective function of the circuit breaker even when it is switched on during a short circuit.

The present invention provides a circuit breaker. The circuit breaker includes:
a main contactor;
a current detector configured to provide test signals of a current to be monitored via the main contactor;
a microprocessor-controlled tripping device including a microprocessor and a watchdog circuit configured to monitor the microprocessor, the tripping device being configured to receive energy from the current detector, to process the test signals and to activate a tripping coil so as to automatically open the main contactor when a settable limit value is exceeded;
a bypass circuit configured to receive energy from the current detector and including a high pass filter connected downstream from the watchdog circuit, a first semiconductor switch connected downstream from the high pass filter, a charging capacitor dischargeable via the first semiconductor switch, and a voltage comparator having a first input, a second input and an output side, the voltage comparator being connected via the first input to the current detector and on the output side to the charging capacitor;
a monitoring circuit configured to apply a first reference voltage to the second input of the comparator when a supply voltage is below a pre-defined threshold level and to apply a second reference voltage to the second input of the comparator when the supply voltage is above the pre-defined threshold level, the first reference voltage being associated with a first current limit value and the second reference voltage being associated with a second current limit value that is smaller than the first current limit value; and
an actuation circuit connected on an output side thereof to the tripping coil and configured to be actuated via a first OR-input by the tripping device and via a second OR-input by the charging capacitor as a function of a state of charge of the charging capacitor.

The invention makes use of the fact that, after the circuit breaker has been switched on, the supply voltage builds up steadily starting at zero up to its final value. At the beginning of this build-up phase, the watchdog circuit is not yet emitting any pulses, while the bypass circuit is already ready to operate at a considerably earlier point in time. As a result, if the circuit breaker is switched on during an already existing short circuit, then the very high test signals emitted by the current detectors as a function of the short circuit situation are processed by the comparator into load pulses for the charging capacitor, said pulses then causing the tripping coil to be actuated within a very short time. In this process, before the supply voltage exceeds the threshold voltage, the higher, first reference voltage applied to the second comparator input by the monitoring circuit ensures that the circuit breaker is not switched off via the bypass circuit already in case of relatively small overcurrents. During normal operation, if the supply voltage exceeds the threshold voltage, the bypass circuit takes over the monitoring of the watchdog pulses. In the meantime, the lower, second reference voltage applied to the second comparator input ensures that, if the watchdog pulses are absent, the circuit breaker is switched off via the bypass circuit already at moderately overcurrents.

In an advantageous embodiment of the invention, the first reference voltage corresponds to the maximum settable tripping current, especially the maximum settable short circuit current. In this manner, if the circuit breaker is switched on during a short circuit, the virtually undelayed switching off never takes place below the actually set tripping current. In an advantageous refinement, the reference voltages are switched over by the monitoring circuit after a threshold time that simulates the threshold value of the supply voltage that is normally reached.

A first pulse shaper stage generates discharge pulses that are to be associated with the watchdog pulses and that are of a sufficient duration to discharge the charging capacitor. A second pulse shaper stage delivers actuation signals of sufficient width, irrespective of the shape of the output signals of the comparator; in this manner, the bypass circuit also responds properly to greatly distorted test signals on the input side since conventional current detectors only deliver greatly shortened test pulses, especially in the case of high short circuit currents.

In an advantageous manner, the reference voltages are switched over electronically, for example, by means of semiconductor switches. It is advantageous to suppress the watchdog pulses, on the one hand, in order to more reliably prevent a discharge of the charging capacitor in the first phase after the switching on and, on the other hand, in order to test the bypass circuit by simulating a failure of the microprocessor.

BRIEF DESCRIPTION OF THE DRAWINGS

Additional details and advantages of the invention ensue from the embodiments below explained with reference to the figures. The following is shown:

FIG. 2: examples of pulse diagrams for illustrating how the invention works.

DETAILED DESCRIPTION

Figure 1:
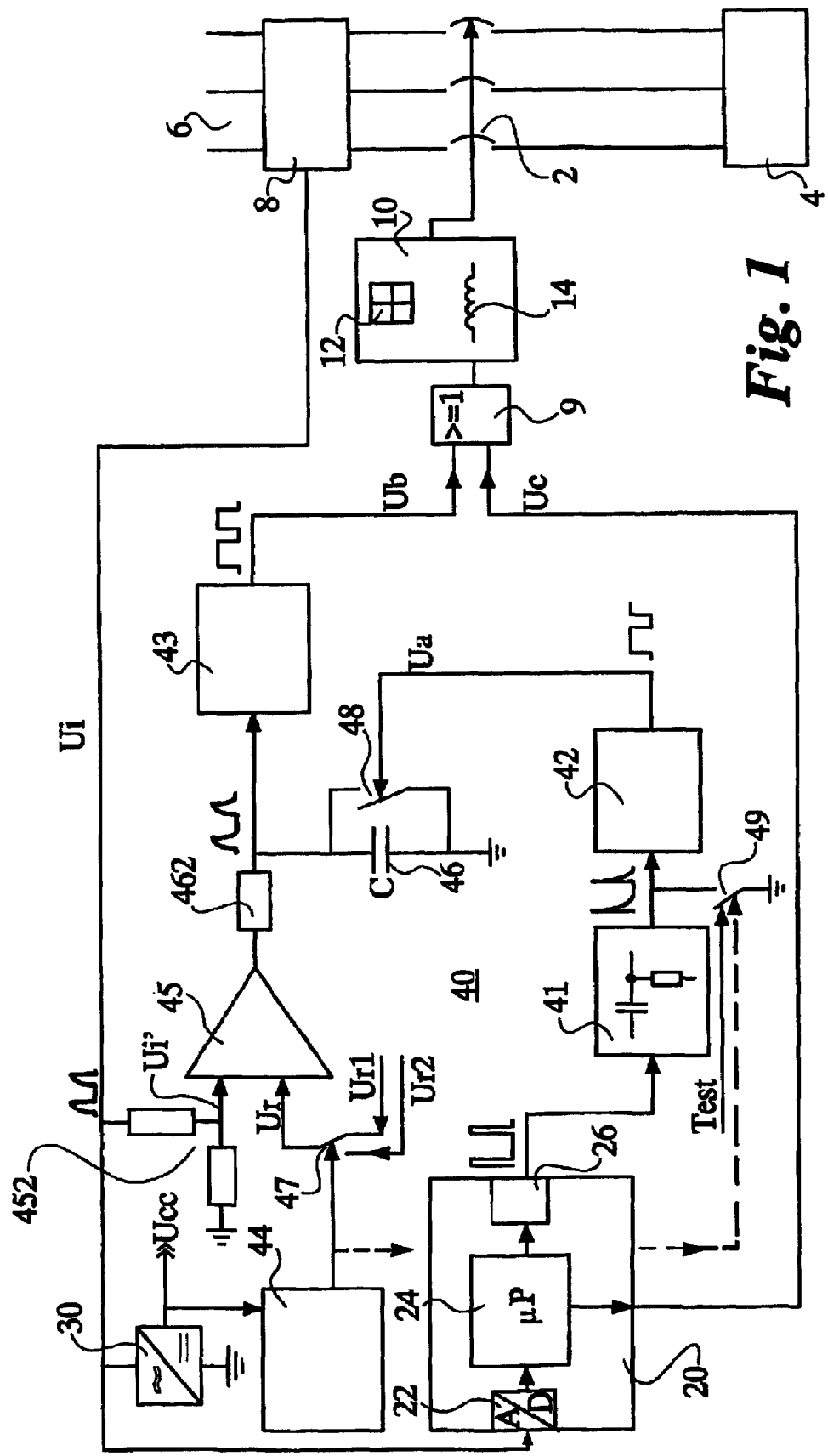
FIG. 1: a schematic depiction of an embodiment of the circuit breaker according to the invention.

FIG. 1 shows a three-conductor circuit breaker which, via its main contactors 2, connects a consumer 4 to a low-voltage energy source 6. The main contactors 2 are opened and closed by means of actuators 10 that normally have an actuation mechanism 12 and an electromagnetic tripping coil 14. The main current that flows to the consumer 4 via the main contactors 2 is detected by means of current detectors 8, for instance, current transformers or magnetic current sensors. The test signals Ui emitted by the current detectors 8 are fed to an electronic tripping device 20. This electronic tripping device 20 converts the test signals Ui into digital signals by means of an analog-to-digital converter 22 and these signals are then evaluated by a microprocessor 24. If the test signals Ui exceed certain settable parameters, especially the tripping current and the appertaining delay time, then the tripping device 20 sends a first tripping signal Uc to a first OR-input of an actuation circuit 9 in order to excite the tripping coil 14, thus automatically opening the main contactor 2. The microprocessor 24 or the tripping device 20 also encompasses a watchdog circuit 26 which constantly emits watchdog pulses when the microprocessor 24 is operating properly. The test signals Ui are also fed to a supply circuit 30 which uses it to provide a supply voltage Ucc that serves to supply energy to the electronic tripping device 20 and to a bypass circuit 40.

The bypass circuit 40 ensures that, in spite of a failure of the electronic tripping device 20, especially a failure of the microprocessor 24, the main contactors 2 are automatically opened when pre-definable critical currents are exceeded. A conventional high pass filter 41 and a first pulse shaper stage 42 are arranged consecutively in the bypass circuit 40, starting from the watchdog circuit 26. The bypass circuit 40 also contains a monitoring circuit 44, a voltage comparator 45, a charging capacitor 46 and a second pulse shaper stage 43. The high pass filter 41 converts the watchdog pulses present on the input side into needle pulses which, however, are absent if no watchdog pulses are emitted, that is to say, if, due to a malfunction of the microprocessor 24, the watchdog circuit 26 remains constantly at the high level or at the low level on the output side. The needle pulses are converted by the first pulse shaper stage 42 into discharge pulses Ua having a sufficient pulse width.

A voltage divider 452 feeds the test signals Ui as attenuated test signals Ui' to the first input of the voltage comparator 45. The monitoring circuit 44 monitors the level of the supply voltage Ucc emitted by the supply circuit; once the circuit breaker is switched on, this supply voltage Ucc increases starting at zero to the final value. The monitoring circuit 44 controls an electronic change-over switch 47. As long as the increasing supply voltage Ucc is still below a pre-defined threshold level, a first reference voltage Ur1 reaches the second input of the comparator 45 via the change-over switch 47 during this initial time interval. In contrast, if the increasing supply voltage Ucc exceeds the defined threshold level, then a second reference voltage Ur2 reaches the second input of the comparator 45 via the change-over switch 47. The first reference voltage Ur1 is associated with a momentary first current limit value that flows via the main contactors 2 and that is represented by corresponding test signals Ui, said current limit value corresponding to the maximum tripping current that can be set with the electronic tripping device 20, for example, twelve times the rated current for which the circuit breaker is dimensioned. The second reference voltage Ur2 is considerably less and is associated with a second current limit value that is represented by corresponding test signals Ui, for instance, four times the rated current. Accordingly, during the initial time interval, the comparator 45 only emits output signals if the attenuated test signals Ui' exceed the first reference voltage Ur1. In the period of time following the initial time interval, the comparator 45 already emits output signals if the attenuated test signals Ui' already exceed the lower voltage Ur2.

The output signals of the comparator 45 are picked up by the charging capacitor 46 connected on one side to the reference potential via a charging resistor 462 that is to be provided for this purpose, if necessary. Parallel to the charging capacitor 46, there is a first semiconductor switch 48 whose control electrode is connected to the output of the first pulse shaper stage 42. If discharge pulses Ua are present at this control electrode, then the charging capacitor 46 is short-circuited in sequence with these discharge pulses, and no substantial voltage level can build up via the charging capacitor 46, irrespective of the test signal Ui emitted by the current detectors 8. The clock frequency of the watchdog pulses or of the discharge pulses Ua is several times higher than the mains frequency supplied by the energy source 6. If the discharge pulses Ua are absent due to a failure of the microprocessor 24, then the comparator 45 quickly charges the charging capacitor 46 when corresponding attenuated test signals Ui' occur that exceed the first or second reference voltage Ur1 or Ur2, respectively, that is present at the second comparator input. The slightly delayed voltage pulses that build up via the charging capacitor 46 are processed by a second pulse shaper stage 43 into second tripping signals Ub having a sufficient width which automatically open the main contactors 2 via a second OR-input of the actuation switch 9. Immediately after the circuit breaker has been switched on, only attenuated test signals Ui' that exceed the first reference voltage Ur1 can lead to the formation of second tripping signals Ub. In contrast, if the supply voltage Ucc has exceeded the threshold value, then test signals Ui' that exceed the lower second reference voltage Ur2 can already lead to the formation of second tripping signals Ub. In contrast, if the discharge pulses Ua are present, then the tripping coil 14 can only be excited by the first tripping signals Uc.

Between the high pass filter 41 and the first pulse shaper stage 42, there is a second semiconductor switch 49 which, by actuating its control electrode, short-circuits the high pass filter at its output, thereby suppressing the further processing of the watchdog pulses. This can be utilized, on the one hand, to test the proper functioning of the bypass circuit 40 in an operational microprocessor 24. On the other hand, the second semiconductor switch 49 can be employed to prevent the further processing of the watchdog pulses and thus the generation of discharge pulses Ua in the initial time interval from the time when the circuit breaker is switched on until the supply voltage Ucc exceeds the threshold voltage. The latter possibility is indicated in FIG. 1 by the connection between the monitoring circuit 44 and the second semiconductor switch 49 depicted by the broken line.

The various ways to trip the circuit breaker of FIG. 1 are explained below with respect to the pulse diagrams shown in FIG. 2. The individual pulse trains are shown at different scales in FIG. 2. In particular, the pulse train of the reference voltage Ur present at the first input of the voltage comparator 45 is depicted at a smaller scale in comparison to the pulse train for the attenuated test signals Ui' at the second input of the comparator 45.

In the time interval t0 to t3, it is assumed, for example, that the circuit breaker is switched on at the rated current and that an overcurrent occurs considerably later while the electronic tripping device 20 is functioning. The circuit breaker is switched on at the rated current at the point in time t0. The attenuated test signals Ui' have a value Un' that corresponds to the rated current. At the point in time t0, the supply voltage Ucc begins to build up from zero. At a slight delay, the higher, first reference voltage Ur1 is present as reference voltage Ur at the second input of the voltage comparator 45 and the test signals Ui' do not exceed this first reference voltage Ur1. At the point in time t1, the supply voltage Ucc has exceeded the pre-defined threshold value, so that the reference voltage Ur makes the transition to the lower, second reference voltage Ur2. From the point in time t1 onwards, the electronic tripping device 20 is fully operational. Due to the emission of watchdog pulses shortly before the point in time t1, discharge pulses Ua are then available. Shortly before the point in time t2, a test signal Ui occurs that corresponds to the overcurrent that has been set at twice the value of the rated current. Subsequently, at the point in time t2, a first tripping signal Uc is generated that automatically opens the main contactor 2 at the point in time t3.

During the time interval t4 to t6, it is assumed, for example, that the circuit breaker is switched on during an already existing short circuit. The circuit breaker is switched on at the point in time t4. The attenuated test signals Ui' exceed the first reference voltage Ur1 that is decisive during the initial time interval, that is to say, twelve times the value Un' corresponding to the rated current. Subsequently, with a slight delay at the point in time t5, a second tripping signal Ub is emitted via the bypass circuit 40 that automatically opens the main contactors 2 at the point in time t6. It should be emphasized that the electronic tripping device 20 is still not operational during the time interval t4 to t6.

In the time interval t7 to t11, it is assumed, for example, that the circuit breaker is switched on at the rated current and that an overcurrent occurs considerably later while the electronic tripping device 20 has failed. The circuit breaker is switched on at the rated current at the point in time t7. At the point in time t8, the reference voltage Ur changes from Ur1 to Ur2. It is assumed that the microprocessor 24 fails at the point in time t9, as a result of which no more discharge pulses Ua can be generated. Automatic tripping, however, does not yet take place as long as the attenuated test signals Ui' remain below the second reference voltage Ur2. Shortly before the point in time t10, however, an attenuated test signal Ui' occurs that is equal to four times the value corresponding to the rated current. Subsequently, at the point in time t11, the bypass circuit 40 generates a second tripping signal Ub.

The present invention is not restricted to the embodiment described above, but rather, it encompasses all embodiments that have the same effect in the sense of the invention. Thus, the invention can be configured, for example, in such a way that the switch-over from the first reference voltage Ur1 to the second reference voltage Ur2 by the monitoring circuit 44 is not carried out as originally described when the threshold voltage is exceeded by the threshold voltage Ucc that is building up, but rather, in a simplified manner, when a defined threshold time is reached. This threshold time is defined such that, from the time when the circuit breaker is switched on until this threshold time, the supply voltage Ucc has normally exceeded the threshold value. Naturally, the threshold time has to be defined as a function of the special configuration of the decisive components, particularly the current detectors 8 and the supply circuit 30.

What is claimed is:

1. A circuit breaker comprising:
    a main contactor;
    a current detector configured to provide test signals of a current to be monitored via the main contactor;
    a microprocessor-controlled tripping device including a microprocessor and a watchdog circuit configured to monitor the microprocessor, the tripping device being configured to receive energy from the current detector, to process the test signals and to activate a tripping coil so as to automatically open the main contactor when a settable limit value is exceeded;
    a bypass circuit configured to receive energy from the current detector and including a high pass filter connected downstream from the watchdog circuit, a first semiconductor switch connected downstream from the high pass filter, a charging capacitor dischargeable via the first semiconductor switch, and a voltage comparator having a first input, a second input and an output side, the voltage comparator being connected via the first input to the current detector and on the output side to the charging capacitor;
    a monitoring circuit configured to apply a first reference voltage to the second input of the comparator when a supply voltage is below a pre-defined threshold level and to apply a second reference voltage to the second input of the comparator when the supply voltage is above the pre-defined threshold level, the first reference voltage being associated with a first current limit value and the second reference voltage being associated with a second current limit value that is smaller than the first current limit value; and
    a actuation circuit connected on an output side thereof to the tripping coil and configured to be actuated via a first OR-input by the tripping device and via a second OR-input by the charging capacitor as a function of a state of charge of the charging capacitor.

2. The circuit breaker as recited in claim 1 wherein first current limit value corresponds to a maximum settable limit value for a tripping current of the circuit breaker.

3. The circuit breaker as recited in claim 1 wherein the monitoring circuit is configured to apply the first reference voltage to the second input of the voltage comparator before a lapsing of a threshold time calculated from a time when the circuit breaker is switched on and to apply the second reference voltage to the second input of the comparator after the lapsing of the threshold time.

4. The circuit breaker as recited in claim 1 wherein the bypass circuit includes a first pulse shaper stage connected between the high pass filter and the first semiconductor switch.

5. The circuit breaker as recited in claim 1 wherein the bypass circuit includes a second pulse shaper stage connected between the charging capacitor and the actuation circuit.

6. The circuit breaker as recited in claim 1 wherein the bypass circuit includes an electronic change-over switch capable of being switched over by the monitoring circuit, the monitoring circuit being configured to feed the first and the second reference voltages to the comparator via the electronic change-over switch.

7. The circuit breaker as recited in claim 1 wherein the watchdog circuit is configured to provide watchdog pulses, and further comprising a pulse suppression device controllable by the monitoring circuit and configured to suppress the watchdog pulses when the supply voltage is below the pre-defined threshold value.

8. The circuit breaker as recited in claim 7 wherein the pulse suppression device includes a second semiconductor switch connected to an output side of the high pass filter.

9. The circuit breaker as recited in claim 1 wherein the watchdog circuit is configured to provide watchdog pulses, and further comprising a pulse suppression device configured to suppress the watchdog pulses.

10. The circuit breaker as recited in claim 9 wherein the pulse suppression device includes a second semiconductor switch connected to an output side of the high pass filter.

11. A circuit breaker comprising:
a main contactor;
a current detector configured to provide test signals of a current to be monitored via the main contactor;
a microprocessor-controlled tripping device including a microprocessor and a watchdog circuit configured to monitor the microprocessor, the tripping device being configured to receive energy from the current detector, to process the test signals and to activate a tripping coil so as to automatically open the main contactor when a settable limit value is exceeded;
a bypass circuit configured to receive energy from the current detector and including a high pass filter connected downstream from the watchdog circuit, a first semiconductor switch connected downstream from the high pass filter, a charging capacitor dischargeable via the first semiconductor switch, and a voltage comparator having a first input, a second input and an output side, the voltage comparator being connected via the first input to the current detector and on the output side to the charging capacitor;
a monitoring circuit configured to apply a first reference voltage to the second input of the voltage comparator before a lapsing of a threshold time calculated from a time when the circuit breaker is switched on and to apply a second reference voltage to the second input of the comparator after the lapsing of the threshold time, the first reference voltage being associated with a first current limit value and the second reference voltage being associated with a second current limit value that is smaller than the first current limit value; and
an actuation circuit connected on an output side thereof to the tripping coil and configured to be actuated via a first OR-input by the tripping device and via a second OR-input by the charging capacitor as a function of a state of charge of the charging capacitor.

12. The circuit breaker as recited in claim 11 wherein first current limit value corresponds to a maximum settable limit value for a tripping current of the circuit breaker.

13. The circuit breaker as recited in claim 11 wherein the bypass circuit includes a first pulse shaper stage connected between the high pass filter and the first semiconductor switch.

14. The circuit breaker as recited in claim 11 wherein the bypass circuit includes a second pulse shaper stage connected between the charging capacitor and the actuation circuit.

15. The circuit breaker as recited in claim 11 wherein the bypass circuit includes an electronic change-over switch capable of being switched over by the monitoring circuit, the monitoring circuit being configured to feed the first and the second reference voltages to the comparator via the electronic change-over switch.

16. The circuit breaker as recited in claim 11 wherein the watchdog circuit is configured to provide watchdog pulses, and further comprising a pulse suppression device controllable by the monitoring circuit and configured to suppress the watchdog pulses when the supply voltage is below the pre-defined threshold value.

17. The circuit breaker as recited in claim 16 wherein the pulse suppression device includes a second semiconductor switch connected to an output side of the high pass filter.

18. The circuit breaker as recited in claim 11 wherein the watchdog circuit is configured to provide watchdog pulses, and further comprising a pulse suppression device configured to suppress the watchdog pulses.

19. The circuit breaker as recited in claim 18 wherein the pulse suppression device includes a second semiconductor switch connected to an output side of the high pass filter.

* * * * *